United States Patent
Kaltwasser

[11] 3,887,025
[45] June 3, 1975

[54] RIGID REAR AXLE SUSPENSION SYSTEMS

[75] Inventor: Helmut Kaltwasser, Eltville, Germany

[73] Assignee: General Motors Corporation, Detroit, Mich.

[22] Filed: Dec. 3, 1973

[21] Appl. No.: 420,759

[30] Foreign Application Priority Data
Dec. 23, 1972 Germany............................ 2263374

[52] U.S. Cl. ............................................ 180/73 TL
[51] Int. Cl............................................ B62d 21/00
[58] Field of Search............ 180/73 TL, 73 TT, 73 R

[56] References Cited
UNITED STATES PATENTS

| | | | |
|---|---|---|---|
| 3,171,642 | 3/1965 | Allison........................ | 180/73 TL X |
| 3,193,042 | 7/1965 | Brewer.............................. | 180/73 R |
| 3,202,236 | 8/1965 | Allison.............................. | 180/73 R |
| 3,603,422 | 9/1971 | Cordiano......................... | 180/73 TL |
| 3,693,746 | 9/1972 | Yamamoto..................... | 180/73 TL |

*Primary Examiner*—Leo Friaglia
*Attorney, Agent, or Firm*—S. Schwartz

[57] ABSTRACT

A rigid rear axle suspension system for a motor vehicle, utilising helical suspension springs or other nonguiding suspension springs, is articulated to the vehicle frame by two control arms extending longitudinally of the vehicle (so-called two-link suspension). At their rear ends the control arms are fixedly secured to respective axle tubes which are rotatably mounted in opposed lateral extensions of a differential housing. A pair of cantilever arms are fixedly secured to the respective axle tubes and project forwardly in the longitudinal direction, the front ends of the cantilever arms being interconnected by way of a pivotal crossmember that is mounted on the differential housing for pivotal movement about its longitudinal centre axis.

The various articulated joints incorporate bonded rubber/metal bushings or the like, with the cantilever arms being effective in conjunction with the pivotal cross-member to produce a roll-stabilising effect at the rear axle.

6 Claims, 5 Drawing Figures

RIGID REAR AXLE SUSPENSION SYSTEMS

This invention relates to rigid rear axle suspension systems for motor vehicles, utilising non-guiding suspension springs, for example helical springs.

Rigid rear axle suspension systems utilising guiding by two longitudinal control arms projecting the direction of travel are already known. The control arms provide both longitudinal and lateral guiding of the rear axle, besides permitting satisfactory absorption of the driving and braking moments. An essential condition for correct operation of the control arms in such a system is that relative torsional movement of the control arms and the axle must be possible, since otherwise springing on curves could not be achieved. Further, the use of only two longitudinal control arms for guiding a rigid rear axle creates the additional problem that, on the one hand, the driving and braking moments acting on the axle must be absorbed, and on the other hand, oppositely directed movements of the wheels, such as occur during cornering for example, must be made possible.

Prior proposals have been made to satisfy these mutually conflicting requirements by providing torsionally resilient articulation of the control arms to the rear axle, or by making the control arms themselves flexurally resilient, or by making the axle tubes torsionally resilient so as to permit relative angulation of the longitudinal control arms with respect to the rear axle acting as an axis of rotation. With all these prior proposals, however, the resilience which has been built into the suspension system makes it necessary to provide a further guide means, for example a transverse control arm or a resilient cross-bar, for the lateral guiding of the rear axle.

By the present invention there is provided a rigid rear axle suspension system for a motor vehicle, utilising non-guiding suspension springs, in which a pair of control arms arranged to extend generally longitudinally of the vehicle are adapted to be articulated at their front end to a frame portion of the vehicle and are fixedly secured at their rear end to respective axle tubes that are rotatably supported at their inboard end by respective laterally opposed portions of a differential housing, and in which a pair of cantilever arms arranged to extend generally longitudinally of the vehicle are fixedly secured at one end to the respective axle tubes and at their other end are interconnected by way of a pivotal cross-member that is mounted on the differential housing for pivotal movement about a centre axis arranged to extend generally longitudinally of the vehicle, the cantilever arms and/or their connections to the pivotal cross-member being constructed to provide resilient take-up of changes in lateral spacing between axle tube and pivotal cross-member during cornering or other conditions involving unequal travel of the suspension springs.

Thereby, it is possible to meet the requirements of correct lateral guiding of the rear axle, and favourable absorption of the driving and braking moments, whilst permitting excellent springing on curves, without the need for a further guide means.

Further, a space-saving arrangement is possible, and true parallel guiding of the rear axle with a high degree of freedom from stress during travel of the suspension springs for both bump and rebound movements, and although only two articulation points to the vehicle frame (which term includes under-body) are required, unequal loading of the suspension springs can be effectively counteracted.

To allow the longitudinal control arms to absorb not only the longitudinal forces but also transverse forces acting on the axle, according to a preferred feature of the invention the longitudinal control arms are designed as triangular members and are welded to the axle tubes over a wide base.

The resilient take-up of changes in lateral spacing between axle tube and pivotal cross-member during cornering or other analogous conditions (notably one wheel bump) can be achieved by the use of resilient connections between the cantilever arms and the pivotal cross member, and/or by making the cantilever arms of resilient construction in the longitudinal direction of the cross-member, preferably by constructing the cantilever arms as sheet-metal pressings which possess some flexibility in the longitudinal direction of the cross-member interconnecting them.

Another preferred feature of the invention is for the cantilever arms projecting in the direction of vehicle travel to be connected to the pivotal cross-member with the interposition of bonded rubber/metal components, conveniently formed as bushings, having cavities disposed in the lengthwise direction of the pivotal cross-member. The restoring forces created during deflection by the resilience of these components do produce a turning moment in the reverse sense, with respect to the cross-member, but this restoring moment is not sufficient to provide any appreciable roll stabilisation.

In accordance with a further important preferred feature of the invention, the pivotal cross-member is pivotally mounted on the differential housing by means of a bonded rubber/metal component, conveniently a bushing, provided with opposed cavities elongated in the direction of pivotal movement of the cross-member (thus, in the circumferential direction in the case of a bushing). By appropriate choice of the torsional resilience of this bonded rubber/metal component, it is possible to influence the roll stability at the rear axle in a simple manner.

The appended claims define the scope of the invention claimed. The invention and how it can be performed are hereinafter particularly described with reference to the accompanying drawings, in which:

Figure 1:
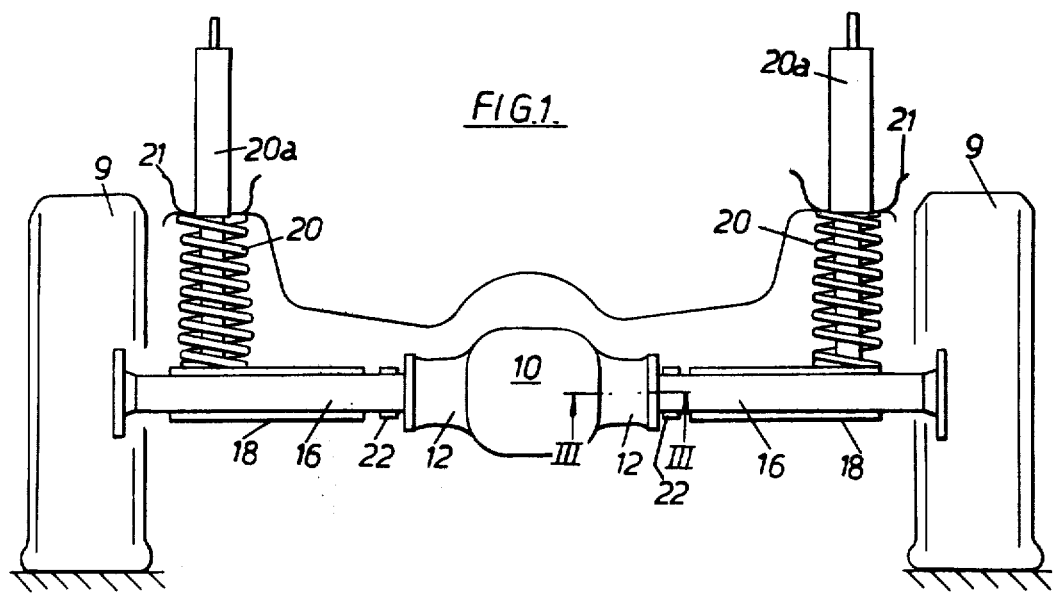
FIG. 1 is a view of a preferred embodiment of a rigid rear axle suspension system in accordance with the present invention, looking in the direction of travel.
Figure 2:
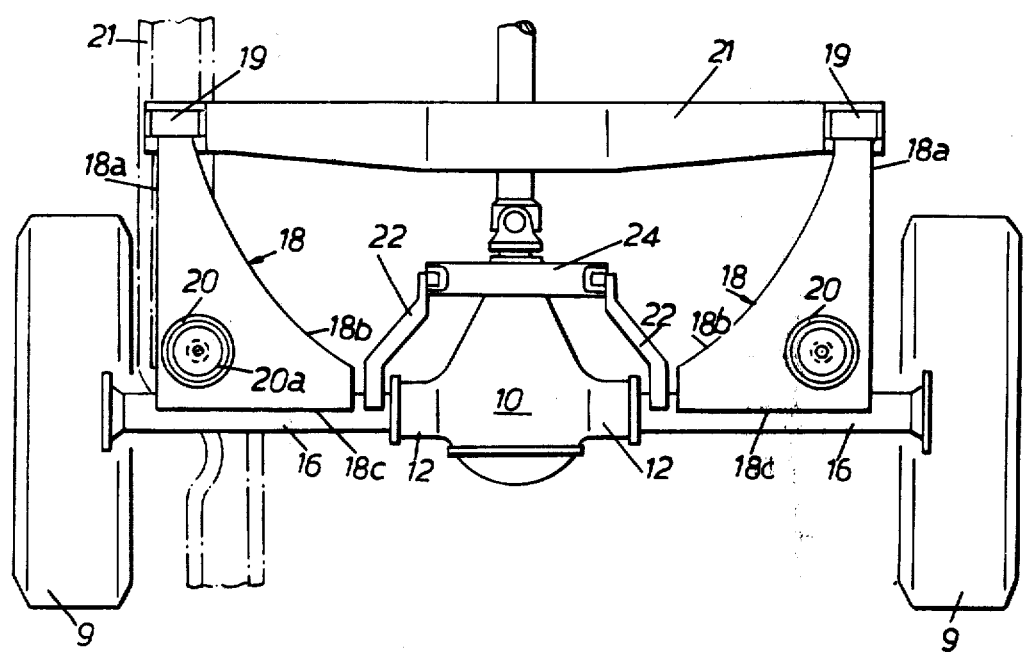
FIG. 2 is a plan view of the rear axle suspension system illustrated in FIG. 1, together with parts of the chassis frame.
Figure 3:
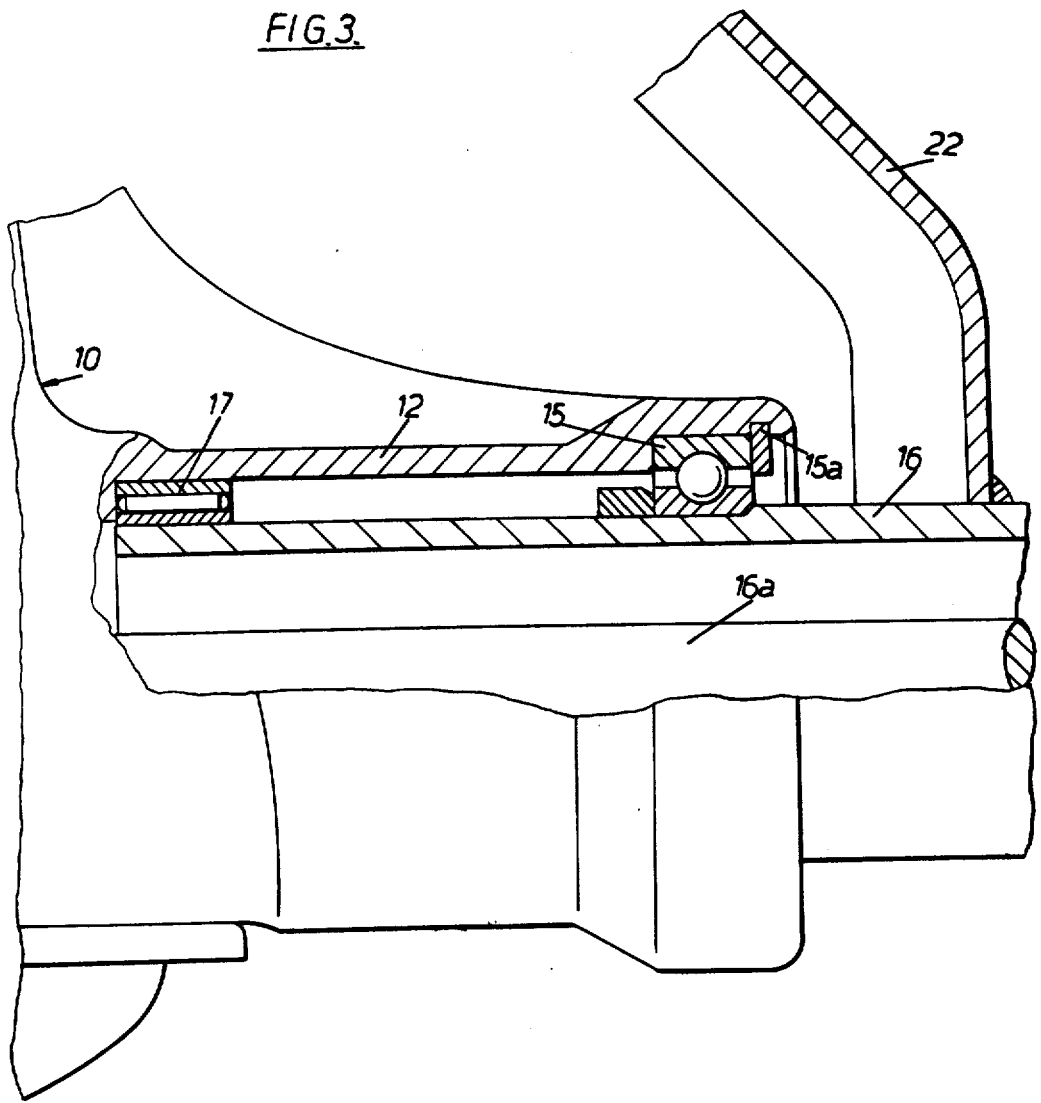
FIG. 3 is a fragmentary section on the line III—III of FIG. 1, in the direction of the arrows, showing a portion of the rear axle and the mounting of an axle tube in the differential housing.
Figure 4:
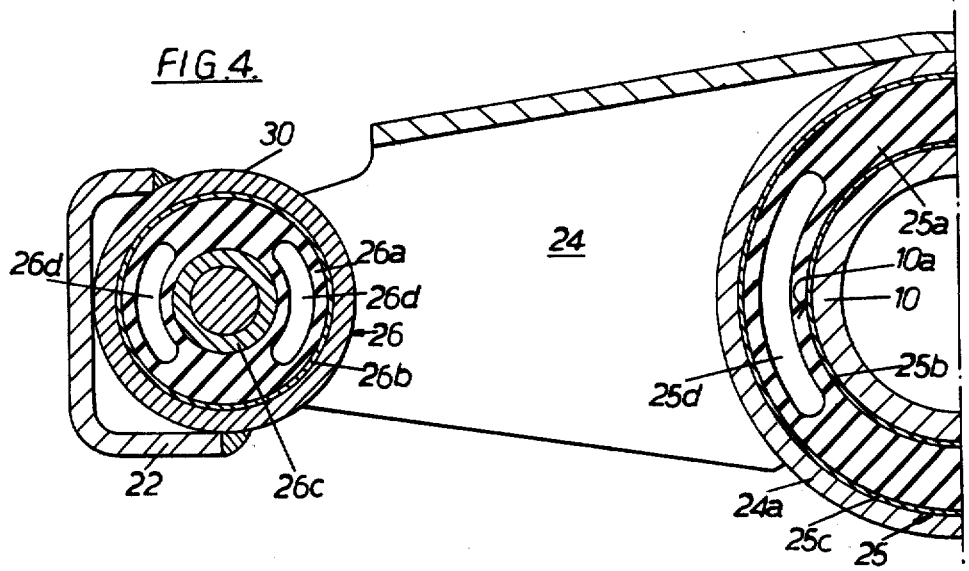
FIG. 4 is a section on line IV—IV of FIG. 5, in the direction of the arrows, showing details of the pivotal cross-member used for the interconnection of two cantilever arms that are connected to respective axle tubes.
Figure 5:
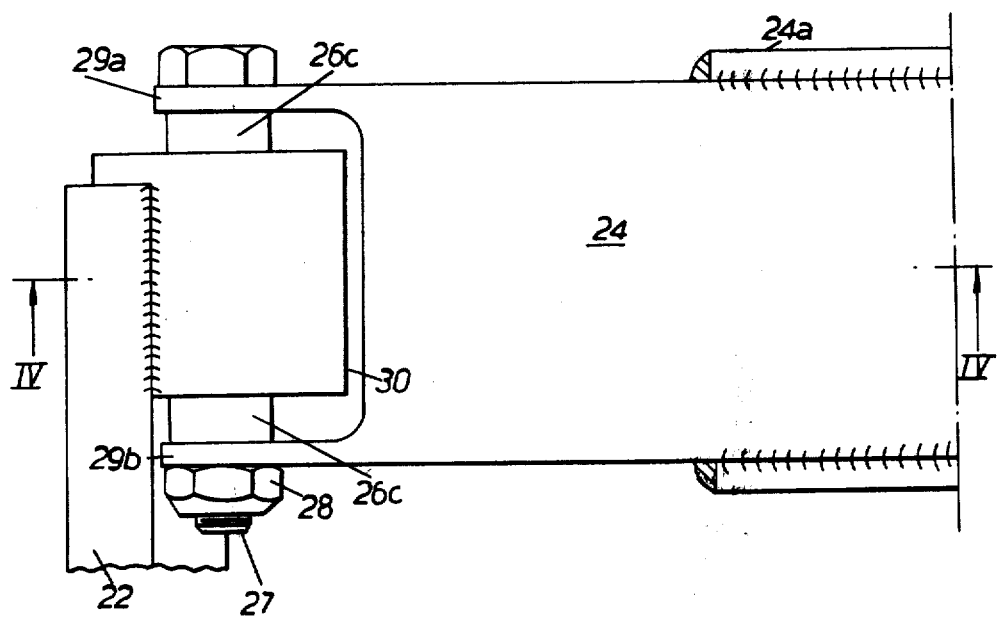
FIG. 5 is a fragmentary view showing the cross-member as viewed in the direction of arrow Z in FIG. 4.

FIGS. 1 and 2 illustrate a preferred embodiment of a rear axle suspension system in accordance with the present invention, and show connections to frame members 21 forming portions of the frame of a motor vehicle. A conventional differential housing 10, which is supported by a part of the vehicle frame, includes laterally opposed extension portions 12 which rotatably support respective axle tubes 16 in a clearance-free manner by the use of plain bearings employing low-friction plastics material, e.g., polytetrafluorethylene, or, as indicated in FIG. 3, by means of roller bearings. FIG. 3 also shows a rotary mounting for the axle tube in the form of a ball bearing 15 with adjacent snap ring 15a as well as by a needle bearing 17. In the axle tube 16 there is the usual half-shaft 16a which transmits the drive to the road wheels 9 (FIGS. 1 and 2). Each of the two axle tubes 16 is rigidly connected to a respective longitudinal control arm 18 extending longitudinally of the vehicle and provided, at its free end, with a boss 19 by means of which the arm is articulated to portions 21 of the vehicle frame (FIG. 2), possibly with the interposition of bonded rubber/metal bushes (not shown).

The longitudinal control arms 18 are designed as rigid triangular members, with one edge 18a extending approximately parallel and in proximity to the wheel plane, and with their inner edge 18b extending obliquely inwardly towards the axle tube, so that a long base 18c is available at the control arms to allow them to be fixedly secured by welding to the respective axle tubes 16. At the axle tubes, or in front of or behind them, helical springs 20 and telescopic dampers 20a for the vehicle suspension may be arranged on the forwardly projecting longitudinal control arms 18 or on extensions thereof. At both sides of the lateral extension portions 12 of the differential housing 10, a pair of cantilever arms 22 extending in the longitudinal direction of the vehicle are also fixedly secured to the respective axle tubes 16. The ends of the cantilever arms 22 remote from the axle tubes are interconnected by way of a pivotal cross-member 24 which is mounted on a forwardly projecting nose portion of the differential housing 10 so as to be pivotable with respect to the differential housing, symmetrically about the longitudinal centre axis of the vehicle. The cantilever arms 22 are constructed as sheet-metal pressings. Unequal loading of the suspension springs 20 and of the telescopic dampers 20a, causing a greater deflection of the control arm 18 on one side of the vehicle as compared with that of the control arm 18 on the other side of the vehicle — therefore resulting in angular rotation of the axle tube 16 at one side of the vehicle with respect to the axle tube at the other side of the vehicle — is compensated by pivotal movement of the cross-member 24 mounted on the differential housing 10, so as to take up an oblique position. Besides this necessary compensation, the main task of the cross-member 24 is to ensure that the reaction component of the driving moment acting on the nose portion of the differential housing is transmitted via the cantilever arms 22 to the axle tubes.

The oblique position taken up by the cross-member 24 due to the differing loadings of the wheels, and the consequent relative angulation of the axle tubes 16, are counteracted by a torsionally resilient mounting for the cross-member 24. An amount of roll stabilisation of the vehicle superstructure is achieved which depends on the magnitude of the restoring forces brought about by the prevailing angle of obliquity of the cross-member. The torsionally resilient mounting for the cross-member 24 is achieved by the use of a bonded rubber/metal component 25 in the form of a bushing consisting of an inner metal sleeve 25b and an outer concentric metal sleeve 25c, the sleeves being spaced apart with the interposition of an annular rubber element 25a which is bonded to the adjacent metal sleeves 25b and 25c by vulcanisation.

The bonded rubber/metal component 25 is press-fitted so as to be incapable of rotation between a metal ring 24a that is fixedly secured to the cross-member 24 by welding and a seating face 10a of the differential housing 10. The annular rubber element 25a is provided with a pair of opposed arcuate through cavities 25d which are elongated in the direction of pivotal movement of the cross member (thus, circumferentially) about the longitudinal axis of the cross-member. By means of these cavities ("windows") the torsionally resilient restoring forces provided by the bonded rubber/metal component 25 are reduced in the manner desired.

As already mentioned, unequal bump movements of the rear wheels cause relative angular movement of the two axle tubes 16, and this, by reason of the corresponding relative angulation of the cantilever arms 22, results in an increase in the spacing of the front articulation points of the cantilever arms 22 where they are interconnected by the cross-member 24.

To compensate for this change in the spacing longitudinally of the cross-member 24, the ends of the cantilever arms 22 have resilient connections to the cross-member, in the form of respective bonded rubber/metal components 26. Each such component 26 is constructed as a bushing, consisting of an outer metal sleeve 26b, an inner tube-like sleeve portion 26c arranged concentric therewith, and an annular rubber element 26a bonded therebetween by vulcanising. The tube-like inner sleeve portion 26c projects axially on both sides beyond the outer sleeve 26b and, by means of a bolt 27 and nut 28, it is firmly clamped between prongs 29a and 29b of a fork-shaped end portion of the cross-member 24. The front ends of the cantilever arms 22 are of U-section, and welded thereto there is a relatively thick-walled metal ring 30 into which the outer metal sleeve 26b of the bonded rubber/metal component 26 is press-fitted.

In the same way as the central torsionally resilient bearing 25 of the cross-member 24, the annular rubber element 26a is provided with two "windows" (through cavities) 26d which extend in a circumferential direction and are disposed diametrically opposite each other in the lengthwise direction of the cross-member 24. In this way each of the cantilever arms 22 is attached to the cross-member 24 in a manner permitting resilient relative movement in the lengthwise direction of the cross-member (that is, transversely of the centre line of the vehicle), thus providing resilient compensation for the changes in spacing and even cardanic deflections between the forward ends of the cantilever arms 22 during opposite relative movement of the cantilever arms.

I claim:

1. A rigid rear axle suspension system for a motor vehicle, utilising non-guiding suspension springs, comprising a differential housing, a pair of axle tubes rotatably supported at inboard ends thereof by respective laterally opposed portions of the differential housing, a pair of longitudinal control arms projecting in a forward direction from the respective axle tubes, means fixedly securing a rear end of each control arm to the respective axle tube, means disposed at a front end of each control arm for providing an articulated connection to a portion of the vehicle frame, a pair of longitudinal cantilever arms projecting in a forward direction from the respective axle tubes, means fixedly securing a rear end of each cantilever arm to the respective axle tube, a cross-member mounted on the differential housing for pivotal movement about a longitudinal centre axis, means providing an articulated connection between a front end of each cantilever arm and a respective end of the pivotal cross-member, and means providing resilient take-up of changes in lateral spacing between the pivotal cross-member and the respective axle tubes, corresponding to vehicle cornering or other conditions involving unequal travel of said suspension springs.

2. A rigid rear axle suspension system for a motor vehicle, utilising non-guiding suspension springs, comprising a differential housing, a pair of axle tubes rotatably supported at inboard ends thereof by respective laterally opposed portions of the differential housing in a clearance-free manner by means of plain bearings made of plastics material, a pair of longitudinal control arms projecting in a forward direction from the respective axle tubes and formed as triangular links having a wide base, a welded connection fixedly securing the wide base of each control arm to the respective axle tube, means disposed at a front end of each control arm for providing an articulated connection to a portion of the vehicle frame, a pair of longitudinal cantilever arms projecting in a forward direction from the respective axle tubes, means fixedly securing a rear end of each cantilever arm to the respective axle tube, a cross-member mounted on the differential housing for pivotal movement about a longitudinal centre axis, means providing an articulated connection between a front end of each cantilever arm and a respective end of the pivotal cross-member, and means providing resilient take-up of changes in lateral spacing between the pivotal cross-member and the respective axle tubes, corresponding to vehicle cornering or other conditions involving unequal travel of said suspension springs.

3. A rigid rear axle suspension system for a motor vehicle, utilising non-guiding suspension springs, comprising a differential housing, a pair of axle tubes rotatably supported at inboard ends thereof by respective laterally opposed portions of the differential housing by means of roller bearings, a pair of longitudinal control arms projecting in a forward direction from the respective axle tubes and formed as triangular links having a wide base, a welded connection fixedly securing the wide base of each control arm to the respective axle tube, means disposed at a front end of each control arm for providing an articulated connection to a portion of the vehicle frame, a pair of longitudinal cantilever arms projecting in a forward direction from the respective axle tubes and formed as sheet-metal pressings, means fixedly securing a rear end of each cantilever arm to the respective axle tube, a cross-member mounted on the differential housing for pivotal movement about a longitudinal centre axis, and means providing an articulated connection between a front end of each cantilever arm and a respective end of the pivotal cross-member, the cantilever arms possessing a flexibility in the lengthwise direction of the pivotal cross-member sufficient to provide resilient take-up of changes in lateral spacing between the pivotal cross-member and the respective axle tubes, corresponding to vehicle cornering or other conditions involving unequal travel of said suspension springs.

4. A rigid rear axle suspension system for a motor vehicle, utilising non-guiding suspension springs, comprising a differential housing, a pair of axle tubes rotatably supported at inboard ends thereof by respective laterally opposed portions of the differential housing, a pair of longitudinal control arms projecting in a forward direction from the respective axle tubes and formed as triangular links having a wide base, a welded connection fixedly securing the wide base of each control arm to the respective axle tube, means disposed at a front end of each control arm for providing an articulated connection to a portion of the vehicle frame, a pair of longitudinal cantilever arms projecting in a forward direction from the respective axle tubes, means fixedly securing a rear end of each cantilever arm to the respective axle tube, a pivotal cross-member, a bonded rubber/metal bushing provided with opposed cavities elongated in a circumferential direction, means connecting the bushing to the central region of the pivotal cross-member and to the differential housing to permit pivotal movement of the cross-member relative to the differential housing about a longitudinal centre axis, means providing an articulated connection between a front end of each cantilever arm and a respective end of the pivotal cross-member, and means providing resilient take-up of changes in lateral spacing between the pivotal cross-member and the respective axle tubes, corresponding to vehicle cornering or other conditions involving unequal travel of said suspension springs.

5. A rigid rear axle suspension system for a motor vehicle, utilising non-guiding suspension springs, comprising a differential housing, a pair of axle tubes rotatably supported at inboard ends thereof by respective laterally opposed portions of the differential housing by means of roller bearings, a pair of longitudinal control arms projecting in a forward direction from the respective axle tubes, means fixedly securing a rear end of each control arm to the respective axle tube, means disposed at a front end of each control arm for providing an articulated connection to a portion of the vehicle frame, a pair of longitudinal cantilever arms projecting in a forward direction from the respective axle tubes, means fixedly securing a rear end of each cantilever arm to the respective axle tube, a cross-member mounted on the differential housing for pivotal movement about a longitudinal centre axis, and a pair of bonded/metal bushings, means connecting each of said bushings to a front end of a respective one of the cantilever arms and to a respective end of the pivotal cross-member, to provide resilient articulated connections between the cantilever arms and the cross-member, said bushings being provided with through cavities disposed in the lengthwise direction of the cross-member, the cantilever arms possessing a degree of flexibility in the lengthwise direction of the pivotal cross-member sufficient to provide resilient take-up of changes in lateral spacing between the pivotal cross-member and the respective axle tubes, corresponding to vehicle cornering or other conditions involving unequal travel of said suspension springs.

6. In a motor vehicle having a frame, a rigid rear axle suspension system comprising a differential housing, a pair of axle tubes rotatably supported at inboard ends thereof by respective laterally opposed portions of the differential housing, a pair of control arms projecting forwardly from the respective axle tubes in the longitudinal direction of the vehicle, the control arms being formed as triangular links having a wide base which is fixedly secured by welding to the respective axle tube, an articulated connection between a front end of each control arm and the vehicle frame, a pair of helical suspension springs interposed between the respective control arms and the vehicle frame, a pair of cantilever arms which are formed as sheet-metal pressings and are fixedly secured at rear ends thereof to the respective axle tube and project forwardly from the respective axle tube in the longitudinal direction of the vehicle, a cross-member extending in a direction transversely of the vehicle, a bonded rubber/metal bushing which is provided with opposed cavities elongated in a circumferential direction and is connected to the central region of the cross-member and to a nose portion of the differential housing to provide for pivotal movement of the cross-member relative to the differential housing about a pivot axis extending in the longitudinal direction of the vehicle, and a pair of bonded rubber/metal bushings each forming a resilient articulated connection between a front end of a respective one of the cantilever arms and a respective end of the pivotal cross-member, said last-mentioned bushings being provided with opposed through cavities disposed in the lengthwise direction of the pivotal cross-member, the cantilever arms being constructed with a degree of flexibility in the lengthwise direction of the pivotal cross-member sufficient to provide resilient take-up of changes in lateral spacing between the pivotal cross-member and the respective axle tubes occurring during vehicle cornering or other conditions involving unequal travel of the suspension springs.

* * * * *